US011827836B2

(12) United States Patent
Ren et al.

(10) Patent No.: US 11,827,836 B2
(45) Date of Patent: Nov. 28, 2023

(54) DEMULSIFIED COMPOSITION

(71) Applicant: STEPAN COMPANY, Northfield, IL (US)

(72) Inventors: Yongling Ginger Ren, Houston, TX (US); Aaron Sanders, Houston, TX (US); Jonathan Mohandessi, Northfield, IL (US)

(73) Assignee: STEPAN COMPANY, Northfield, IL (US)

( * ) Notice: Subject to any disclaimer, the term of this patent is extended or adjusted under 35 U.S.C. 154(b) by 0 days.

(21) Appl. No.: 17/949,433

(22) Filed: Sep. 21, 2022

(65) Prior Publication Data

US 2023/0020005 A1    Jan. 19, 2023

Related U.S. Application Data

(60) Division of application No. 17/133,320, filed on Dec. 23, 2020, now Pat. No. 11,472,994, which is a continuation of application No. PCT/US2019/031038, filed on May 7, 2019.

(60) Provisional application No. 62/690,676, filed on Jun. 27, 2018.

(51) Int. Cl.
   *C09K 8/035*    (2006.01)
   *E21B 21/06*    (2006.01)

(52) U.S. Cl.
   CPC .............. *C09K 8/035* (2013.01); *E21B 21/06* (2013.01); *E21B 21/063* (2013.01); *E21B 21/065* (2013.01)

(58) Field of Classification Search
   CPC ....... C09K 8/035; E21B 21/06; E21B 21/063; E21B 21/065
   See application file for complete search history.

(56) References Cited

U.S. PATENT DOCUMENTS

| 2,078,652 A | 4/1937 | De Groote |
| 2,106,240 A | 1/1938 | De Groote |
| 4,140,640 A | 2/1979 | Scherubel |
| 5,858,247 A | 1/1999 | Campbell |
| 6,977,048 B2 | 12/2005 | Mueller |
| 7,786,179 B2 | 8/2010 | Talingting-Pabalan |
| 2008/0121564 A1 | 5/2008 | Smith |
| 2009/0209664 A1 | 8/2009 | Talingting-Pabalan |

(Continued)

FOREIGN PATENT DOCUMENTS

| CA | 784771 | 5/1968 |
| WO | 2009073438 | 6/2009 |
| WO | 2010045090 | 4/2010 |

(Continued)

OTHER PUBLICATIONS

Hiajivand, P. and Vaziri, A.. Optimization of Demulsifier Formulation for Separation of Water From Crude Oil Emulsions. Braz. J. Chem. Eng. [online]. 2015, vol. 32, n.1 [cited Dec. 20, 2020], pp. 107-118.

(Continued)

*Primary Examiner* — Aiqun Li
(74) *Attorney, Agent, or Firm* — DILWORTH IP, LLC

(57) ABSTRACT

A demulsified composition comprising a clear oil phase comprising hydrocarbons, a clear brine phase comprising up to 5 wt. % of a diethanolamine-based $C_8$-$C_{18}$ alkanolamide demulsifying agent, and a water-wetted solid phase.

8 Claims, 2 Drawing Sheets

(56) References Cited

U.S. PATENT DOCUMENTS

2010/0186767 A1* 7/2010 Martin .................. E21B 21/065
                                                        134/1
2013/0312958 A1* 11/2013 Denyer .................. E21B 43/16
                                                        166/67

FOREIGN PATENT DOCUMENTS

| WO | 2013089896 A2 | 6/2013 |
| WO | 2017099706 A1 | 6/2017 |
| WO | 2017099709    | 6/2017 |

OTHER PUBLICATIONS

Hareland, Jr. et al, "Hydrocarbons Separation from Drilling Waste: Mud and Cutting Treatment Using Deep Eutectic Solvents", American Association of Drilling Engineers, Copyright 2018, AADE, pp. 1-6.

International Search Report and Written Opinion, Issued in International Application No. PCT/US2019/031038, dated Jun. 27, 2019, 12 pages.

Office Action (Non-Final Rejection) dated Mar. 1, 2022 for U.S. Appl. No. 17/133,320 (pp. 1-10).

Office Action (Notice of Allowance and Fees Due (PTOL-85)) dated Jun. 23, 2022 for U.S. Appl. No. 17/133,320 (pp. 1-7).

* cited by examiner (a) (b) (c) (d) (e)

(f) (g) (h) (i)

(a)  (b)  (c)  (d)  (e)

(j)  (k)  (l)

DEMULSIFIED COMPOSITION

FIELD OF THE INVENTION

The invention relates to a demulsified composition.

BACKGROUND OF THE INVENTION

Drilling fluids, or drilling "muds," are used in the oilfield industry to aid in the drilling of boreholes. The drilling fluid can serve many purposes, including (among other things) maintaining hydrostatic pressure to keep formation fluids from entering the well bore, keeping the drill bit cool and clean during drilling, suspending cuttings, and minimizing formation damage. Drilling fluids can be water-based, hydrocarbon-based, or emulsions of water, hydrocarbons, and other components. The composition of the drilling fluid will usually be tailored to meet the unique demands of a formation.

Drilling salt domes poses unusual challenges in maintaining integrity of the formation, particularly when aqueous drilling fluids are used. In this case, a heavy brine phase having more than 25% of total dissolved solids (TDS) content is used to keep formation salts from dissolving into the drilling fluid and compromising formation integrity. To balance the hydraulic pressure while drilling, the heavy brine is emulsified with 10 to 50 wt. % of a hydrocarbon and a surfactant designed to stabilize the emulsion (i.e., an emulsifier). This "direct emulsion" drilling fluid has lower density compared with the heavy brine.

Waste management is a key concern in drilling operations. When drilling is discontinued, waste drilling fluid is collected and must be treated before disposal or recycling. Most of the hydrocarbons from the emulsion need to be recovered and reused. Demulsifiers and engineering means such as heating, centrifugation, and shaker screens are commonly used to encourage emulsion breaking. Recovered brine can be reused for hydraulic fracturing or other oilfield processes. Recovered solids, which will include cuttings, clays used as viscosifiers for the drilling fluid, and other solids, are typically landfilled.

To get a clean separation of the oil, brine, and solids, it is necessary for the solids to be wetted well with water; otherwise, too much of the oil phase is lost in the solids. Traditional demulsifiers, such as dodecylbenzene sulfonic acid and its salts or resin polymer chemistries, have not been entirely satisfactory in this regard, particularly when the emulsion contains a high-TDS brine.

The industry would benefit from improved ways to demulsify recovered drilling fluid emulsions, particularly the emulsions required for drilling salt domes and other high-salt formations. Preferably, the emulsions could be separated rapidly into three distinct phases: an oil phase, a brine phase, and a water-wet solid phase. Ideally, at least 80% of the hydrocarbon used in the drilling fluid could be recovered from the waste fluid.

SUMMARY OF THE INVENTION

In one aspect, the invention relates to a two-step method for demulsifying a recovered drilling fluid. A recovered drilling fluid is first combined with dilution water and a demulsifying agent. The recovered drilling fluid comprises 10 to 40 wt. % hydrocarbons, 50 to 80 wt. % of a brine having at least 25% total dissolved solids, an emulsifier, and 10 to 20 wt. % of undissolved oil-wetted solids. The demulsifying agent comprises a diethanolamine-based ("DEA"-based) $C_8$-$C_{18}$ alkanolamide. In a second step, the mixture is separated, or is allowed to separate, into three distinct phases, including a clear oil phase comprising the hydrocarbons, a clear brine phase, and a water-wetted solid phase.

In other aspects, the invention includes compositions suitable for use as demulsifiers and demulsified compositions comprising a clear oil phase comprising hydrocarbons, a clear brine phase comprising up to 5 wt. % of a diethanolamine-based $C_8$-$C_{18}$ alkanolamide demulsifying agent, and a water-wetted solid phase.

We surprisingly found that diethanolamine-based $C_8$-$C_{18}$ alkanolamides enable rapid, clean separation of phases and efficient recovery of 80% or more of the oil phase from the recovered drilling fluid.

DETAILED DESCRIPTION OF THE INVENTION

Figure 1:
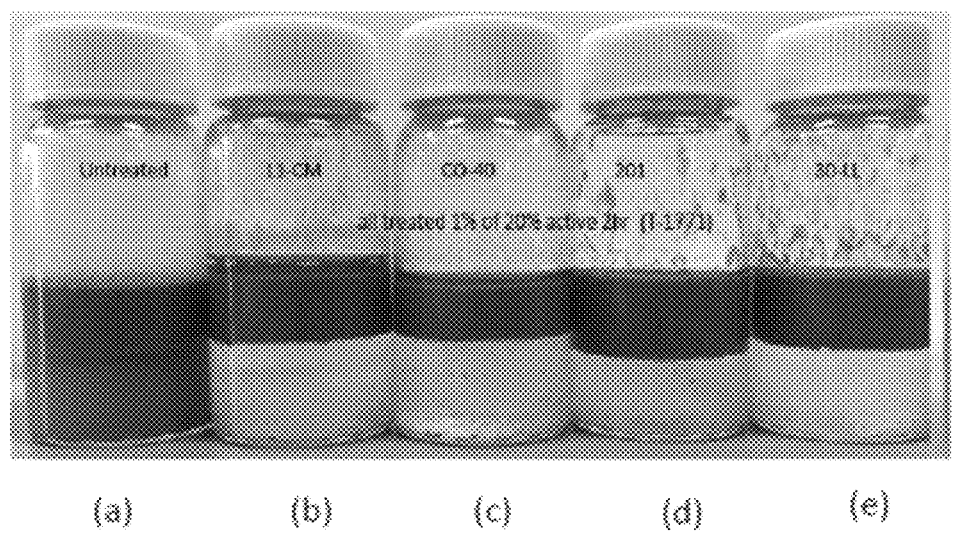
FIG. 1 is a photograph showing two-hour results for recovered drilling fluids that are treated with: (a) nothing (control); or (b)-(e) a DEA-based alkanolamide.

In one aspect, the invention relates to a demulsifying method for method for isolating components from drilling fluids recovered in oilfield applications. The method comprises two steps. A recovered drilling fluid is combined with dilution water and a demulsifying agent. The mixture is then separated to give distinct phases: an oil phase, a brine phase, and a water-wetted solid phase.

The Recovered Drilling Fluid

Prior to its use in the drilling process, the drilling fluid is an emulsion that usually comprises 20 to 50 wt. % hydrocarbons, 50 to 80 wt. % of a heavy brine (at least 25 wt. % of total dissolved solids content), and an emulsifier. The fluid may also contain viscosifying agents such as clays (e.g., bentonite or montmorillonite) or polymer additives as well as one or more emulsifiers to keep the brine and hydrocarbon phases from separating during the drilling process or during pauses in the drilling process prior to recovery of the drilling fluid.

These emulsions are well-suited for use in drilling formations that have high salt contents. If brines having lower TDS are used, the brine may tend to erode the formation by dissolving salt content from the formation into the brine phase.

Upon recovery after its use, the drilling fluid will also contain undissolved solids from the cutting process. The recovered fluid is typically a muddy, emulsified mixture of these components and may comprise 10 to 40 wt. % hydrocarbons, 50 to 80 wt. % of the brine, the emulsifier, and 10 to 20 wt. % of undissolved oil-wetted solids.

In some aspects, the hydrocarbons may comprise a diesel fuel, alpha-olefins, a refined mineral oil, or a combination thereof.

In some aspects, the brine has 25 to 35 wt. %, or 27 to 30 wt. %, of total dissolved solids.

In some aspects, the pH of the recovered drilling fluid is within the range of 6 to 13, or is within the range of 9 to 11.

Dilution Water

The recovered drilling fluid is combined with dilution water and a demulsifying agent. The dilution water is from any convenient source, but it should have a relatively low content of total dissolved solids. Tap water is suitable and preferred. Generally, the amount of dilution water used is roughly equal in proportion to the amount of recovered drilling fluid. Thus, in preferred aspects, the recovered drilling fluid is combined with 40 to 60 wt. % of water based on the combined amounts of recovered drilling fluid and water. The dilution water thins the recovered drilling fluid and facilitates separation into distinct phases.

The Demulsifying Agent

The recovered drilling fluid and dilution water are combined, in any desired order, with a demulsifying agent. The demulsifying agent comprises a diethanolamine-based $C_8$-$C_{18}$ alkanolamide, preferably a diethanolamine-based $C_{10}$-$C_{14}$ alkanolamide. The demulsifying agent is preferably diluted to 10 to 30 wt. % actives content with a $C_1$-$C_4$ alcohol, preferably methanol or isopropanol, or a mixture of a $C_1$-$C_4$ alcohol and water, such as a 5 to 20 wt. % mixture of the $C_1$-$C_4$ alcohol in water. In some cases, use of a demulsifying agent having an actives content higher than 30 wt. % may result in undesirable gelling of the mixture. However, if the actives content of the demulsifying agent is well below 10 wt. %, it may be ineffective in breaking the emulsion.

In some aspects, 0.1 to 5 wt. %, or 0.5 to 2 wt. %, of demulsifying agent is used based on the combined amounts of recovered drilling fluid, dilution water, and demulsifying agent.

The demulsifying agent is based on diethanolamine. We found that monoethanolamine-based $C_8$-$C_{18}$ alkanolamides, which are also widely available commercially, are relatively ineffective in breaking the emulsion (see FIG. 2 and the comparative examples provided below). In contrast, $C_8$-$C_{18}$ alkanolamides based on diethanolamine are highly effective in facilitating rapid, clean separation of the three desired phases (see FIG. 1 and FIG. 3 and the examples below).

Suitable diethanolamine-based $C_8$-$C_{18}$ alkanolamides are commercially available. For example, NINOL® 11-CM (cocamide DEA), NINOL® 40-CO (cocamide DEA), NINOL® 30-LL (lauramide DEA), NINOL® 201 (oleamide DEA), and NINOL® 1281 (cocamide DEA, modified), all products of Stepan, are readily available and suitable for use. In some aspects, the diethanolamine-based $C_8$-$C_{18}$ alkanolamide is selected from cocamide DEA, lauramide DEA, myristamide DEA, and oleamide DEA. Cocamide DEA is particularly preferred for its ability to promote rapid, clean separation of phases.

The recovered drilling fluid, dilution water, and demulsifying agent can be combined at any desired temperature. Preferably, they are combined at a temperature within the range of 15° C. to 60° C.

Separation of Phases

The mixture of recovered drilling fluid, dilution water, and demulsifying agent is allowed to separate, or is separated, by any convenient means into three distinct phases, including a clear oil phase comprising the hydrocarbons, a clear brine phase, and a water-wetted solid phase. The separation process normally is completed within 48 hours, sometimes much faster. In the absence of an engineering method to encourage separation (e.g., by agitating, stirring, centrifugation, heating, screen shaking, or the like), some separation will be evident within the first two hours. The brine and oils phases begin to separate first, followed by water-wetting of the solids to release hydrocarbons adsorbed into the solid phase. Preferably, at least 80% of the hydrocarbons from the recovered drilling fluid are isolated in the oil phase.

Figure 4:
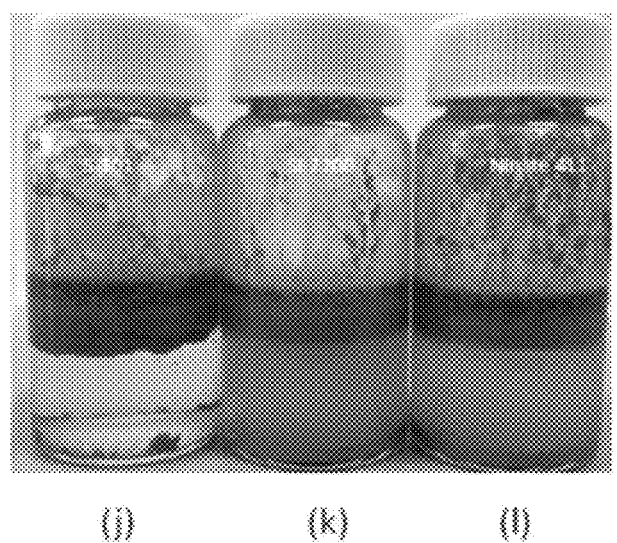
FIG. 4. is a photograph showing 48-hour results from recovered drilling fluids that are treated with: (j) BIO-SOFT® S-101, an alkylbenzene sulfonic acid; (k) REZI-FLOW® 2200 demulsifier; or (l) NINATE® 411, an alkylbenzene sulfonic acid, IPA salt.

Use of a demulsifying agent comprising a diethanolamine-based $C_8$-$C_{18}$ alkanolamide promotes unexpectedly facile separation of into a clear oil phase, a clear brine phase, and a water-wetted solid phase. With conventional demulsifiers, such a clean separation is not easily achieved. For instance, our results with dodecylbenzene sulfonic acid or its salts and with a commercial phenolic resin demulsifier failed to generate a water-wet solid phase within 3 days (see FIG. 4).

The separation of phases can be conducted at any convenient temperature Preferably, the phases are separated at a temperature within the range of 15° C. to 60° C.

Demulsified Compositions

In other aspects, the invention relates to demulsified compositions. The compositions comprise a clear oil phase comprising hydrocarbons, a clear brine phase comprising up to 5 wt. % of a diethanolamine-based $C_8$-$C_{18}$ alkanolamide demulsifying agent, and a water-wetted solid phase. "Clear" refers to a phase that has little or no emulsified solids content evident, although the phase may have color or be colorless.

Demulsifying Agents

In other aspects, the invention includes compositions suitable for use as demulsifying agents. Such compositions comprise 10 wt. % to 30 wt. %, or 15 wt. % to 25 wt. %, of a diethanolamine-based $C_8$-$C_{18}$ alkanolamide active material in a $C_1$-$C_4$ alcohol or a mixture of a $C_1$-$C_4$ alcohol and water. As demonstrated below, these demulsifying agents are remarkably effective for use with recovered drilling fluids based on emulsions of hydrocarbons and high-salinity brines.

The following examples merely illustrate the invention; the skilled person will recognize many variations that are within the spirit of the invention and scope of the claims.

Inventive Examples

Figure 2:
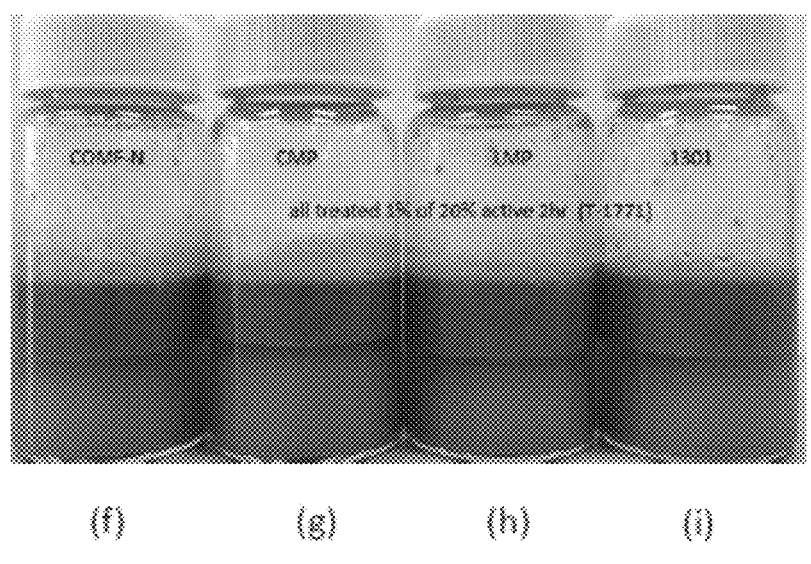
FIG. 2 is a photograph showing two-hour results for recovered drilling fluids that are treated with: (f)-(h) a monoethanolamine (MEA)-based alkanolamide; or (i) a PEG cocamide.
Figure 3:
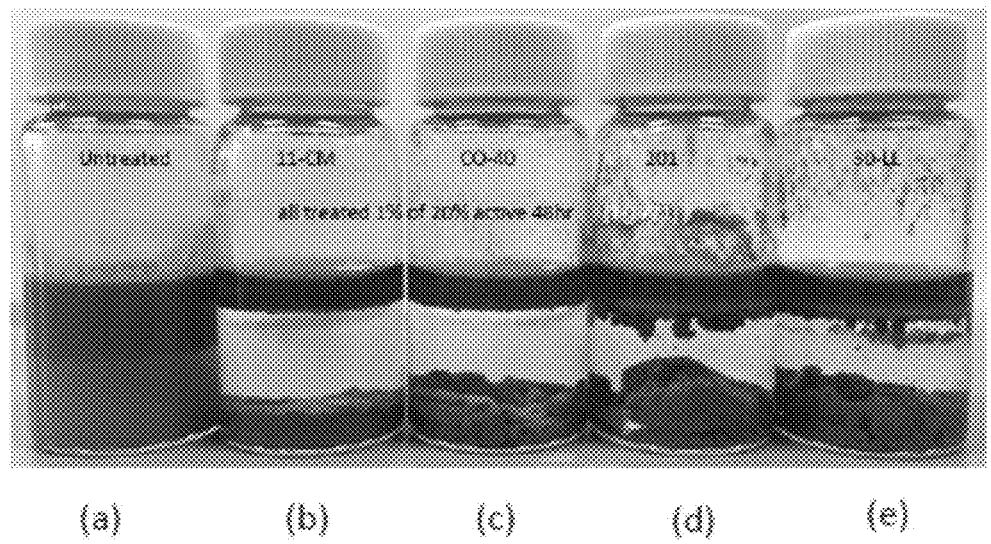
FIG. 3 is a photograph showing 48-hour results from recovered drilling fluids that are treated with: (a) nothing (control); or (b)-(e) a DEA-based alkanolamide.

A sample of recovered drilling fluid is combined in a vial with a roughly equal proportion of tap water. About 0.5 to 2.0 wt. % of demulsifier solution is added. The demulsifier solution is produced by diluting NINOL® 11-CM (cocamide diethanolamine, product of Stepan Company) with ethanol or a mixture of ethanol and water to 20% actives content. The vial is capped, shaken, and allowed to stand. After 2 h, phase separation is evident, but the solids remain oil-wetted (FIG. 1). After 48 h, excellent separation into three distinct phases—oil, brine, and water-wet solid—is observed (FIG. 3).

The procedure is repeated using the following diethanolamine-based alkanolamides: NINOL® 40-CO (cocamide DEA), NINOL® 30-LL (lauramide DEA), NINOL® 201 (oleamide DEA), and NINOL® 1281 (cocamide DEA, modified), all products of Stepan. For each sample, after 2 h, phase separation is evident, but the solids remain oil-wetted (see FIG. 1). After 48 h, excellent separation into three distinct phases—oil, brine, and water-wet solid—is observed (see FIG. 3).

Comparative Examples

The procedure is repeated using the following monoethanolamine-based alkanolamides: NINOL® CMP (cocamide MEA), NINOL® COMF-N (cocamide MEA), NINOL® LMP (lauramide MEA), all products of Stepan, and NINOL® 1301 (PEG-6 cocamide). After 2 h, there is no significant separation of layers, and solids are evident in both an emulsified oil phase and an emulsified aqueous phase (see FIG. 2).

The procedure is repeated with BIO-SOFT® S-101 (dodecylbenzene sulfonic acid), product of Stepan, REZI-FLOW® 2200 phenolic resin demulsifier, product of SI Group), or NINATE® 411 (dodecylbenzene sulfonic acid, isopropylamine salt), product of Stepan. None of the surfactants provides a water-wet solid phase within 3 days (see FIG. 4). BIO-SOFT® S-101 affords good oil/water separation, but most of the solids are not water-wet.

The preceding examples are meant only as illustrations; the following claims define the scope of the invention.

We claim:

1. A demulsified composition comprising:
   (a) a clear oil phase comprising hydrocarbons;
   (b) a clear brine phase comprising up to 5 wt. % of a diethanolamine-based C8-C18 alkanolamide demulsifying agent; and
   (c) a water-wetted solid phase,
   the composition being produced by a method comprising:
   (i) combining a recovered drilling fluid with dilution water and a demulsifying agent, the recovered drilling fluid comprising 10 to 40 wt. % hydrocarbons, 50 to 80 wt. % of a brine having at least 25% total dissolved solids, an emulsifier, and 10 to 20 wt. % of undissolved oil-wetted solids, and the demulsifying agent comprising 10 wt % to 30 wt % of a diethanolamine-based $C_8$-$C_{18}$ alkanolamide active material in a $C_1$-$C_4$ alcohol or a mixture of a $C_1$-$C_4$ alcohol and water, the demulsifying agent being used in an amount of 0.1 to 5 wt % based on the combined amounts of recovered drilling fluid, dilution water, and demulsifying agent,
   wherein the recovered drilling fluid is combined with 40 to 60 wt. % of dilution water based on the combined amounts of recovered drilling fluid and water; and
   (ii) allowing the mixture to separate into the clear oil phase, the clear brine phase, and the water-wetted solid phase, in the absence of an engineering method to encourage separation.

2. The composition of claim 1 wherein the hydrocarbons comprise a diesel fuel, alpha-olefins, a refined mineral oil, or a combination thereof.

3. The composition of claim 1 wherein the demulsifying agent comprises a diethanolamine-based C8-C18 alkanolamide selected from the group consisting of cocamide DEA, lauramide DEA, myristamide DEA, and oleamide DEA.

4. The composition of claim 1 wherein the brine of the recovered drilling fluid contains total dissolved solids in an amount of 25 to 35 wt %.

5. The composition of claim 4 wherein the brine of the recovered drilling fluid contains total dissolve solids in an amount of 27 to 30 wt %.

6. The composition of claim 1 wherein the drilling fluid has a pH of 6 to 13.

7. The composition of claim 6 wherein the pH of the drilling fluid is 9 to 11.

8. The composition of claim 1 wherein the demulsifying agent is used in an amount of 0.1 to 0.5 wt % based on the combined amounts of recovered drilling fluid, dilution water, and demulsifying agent.

\* \* \* \* \*